(12) United States Patent
Meyer

(10) Patent No.: US 9,742,571 B2
(45) Date of Patent: Aug. 22, 2017

(54) DETERMINING AN IDENTIFIER

(71) Applicant: Infineon Technologies AG, Neubiberg (DE)

(72) Inventor: Bernd Meyer, Munich (DE)

(73) Assignee: Infineon Technologies AG, Neubiberg (DE)

(*) Notice: Subject to any disclaimer, the term of this patent is extended or adjusted under 35 U.S.C. 154(b) by 0 days.

(21) Appl. No.: 14/452,906

(22) Filed: Aug. 6, 2014

(65) Prior Publication Data

US 2015/0046718 A1    Feb. 12, 2015

(30) Foreign Application Priority Data

Aug. 6, 2013    (DE) .................. 10 2013 013 047

(51) Int. Cl.
*G06F 11/30*    (2006.01)
*H04L 9/32*    (2006.01)
*H04L 9/08*    (2006.01)

(52) U.S. Cl.
CPC .......... *H04L 9/3278* (2013.01); *H04L 9/0866* (2013.01); *H04L 9/0877* (2013.01)

(58) Field of Classification Search
None
See application file for complete search history.

(56) References Cited

U.S. PATENT DOCUMENTS

| | | | | |
|---|---|---|---|---|
| 5,726,435 A | * | 3/1998 | Hara | G06K 7/14 |
| | | | | 235/462.09 |
| 8,386,990 B1 | * | 2/2013 | Trimberger | H01L 23/544 |
| | | | | 257/798 |
| 2015/0071432 A1 | * | 3/2015 | Zhu | G11C 11/1673 |
| | | | | 380/28 |

* cited by examiner

*Primary Examiner* — Esther B Henderson
(74) *Attorney, Agent, or Firm* — Schiff Hardin LLP

(57) ABSTRACT

A method for determining an identifier on the basis of a multiplicity of cells is proposed, wherein the cells are subdivided into subsets, wherein the fact of whether a reconstructable information item is determinable is ascertained for each of the subsets, wherein, if a reconstructable information item is determinable for a subset, the reconstructable information item is determined and stored, wherein, if a reconstructable information item is not determinable for a subset, an error information item is determined and stored for this subset.

16 Claims, 3 Drawing Sheets

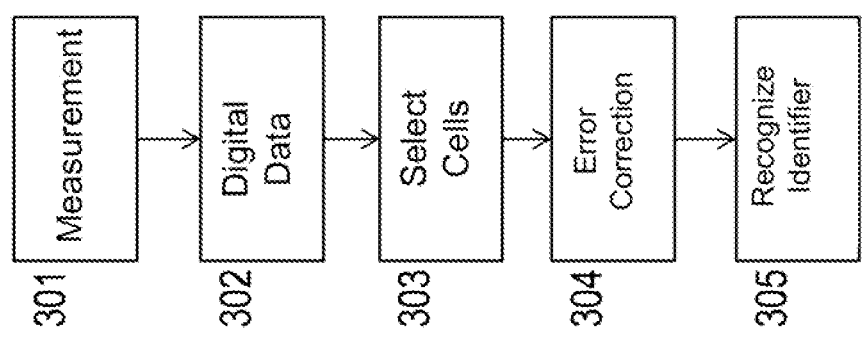

DETERMINING AN IDENTIFIER

The invention relates to a method and a device for determining an identifier on the basis of a multiplicity of cells. Furthermore, a corresponding system and computer program product are proposed.

A physical unclonable function (PUF) is known as a function which is realized by a physical structure which can be easy to evaluate but difficult to predict. A PUF device is intended to be easy to produce but practically impossible to duplicate, even if the production process is known. In this respect, it is the hardware realization of a one-way function. For details concerning PUFs, reference should be made to http://en.wikipedia.org/wiki/Physical_unclonable_function.

From small differences in the embodiment of the hardware of individual chips, the PUF attempts to derive a robust, unique fingerprint of the hardware. Such hardware differences normally arise as a result of unpreventable manufacturing tolerances or are produced artificially during the production of the semiconductors and do not influence the normal function of the hardware. Examples of such tolerances are transit times of individual gates, switch-on behaviour of electronic components or specific coatings having resistive, capacitive or inductive properties.

A specific algorithm (in hardware or software) is implemented in a controller in order to measure the manufacturing tolerances and convert them into digital data. The measured data are subjected to an error correction in order that random influences such as noise of the measuring device, ambient properties, operating parameters or aging of the hardware do not influence the result of the evaluation of a PUF and the calculated value can be reconstructed sufficiently robustly in each individual evaluation. The fingerprint obtained in this way is individual to each chip and can be used as a key, for example, in order to protect memory contents. This basic procedure has parallels to the evaluation of biometric features when identifying persons.

Calculating the chip-specific fingerprint generally requires further auxiliary data (for example operating parameters and information for the error correction of the raw data), which for example are stored in a nonvolatile memory (Flash, EEPROM) on the chip or are stored in an external component and are made accessible to the chip via a corresponding interface during the calculation.

The use of a PUF affords the property that, in the event of an attacker making an attempt to manipulate the hardware, for example in order to extract the key data calculated by the PUF, the hardware is altered such that the PUF yields different values and the key originally used is destroyed. Such a key stored in the hardware can bind the functionality of a device to the hardware and thus be used for protection against the creation of plagiarizations and duplications.

The efficiency of a PUF implementation is essentially determined by the complexity for the error correction of the measured data. The error correction of the measured raw data of the PUF ensures that in the specified application scenarios and over the lifetime the same PUF data can always be reconstructed as the result of the measuring operation. Factors which contribute to the efficiency of the error correction here include the rate of the required raw data bits per extracted data bit, the size of the auxiliary data required for this purpose (for example syndromes of the error correction code, which have to be stored in nonvolatile memory such as Flash, EEPROM, FeRAM, etc.) and the performance of the actual correction method in hardware and/or software.

In many embodiments of PUFs, subjecting the measured raw data of the PUF bits directly to an error correction without an additional pretreatment is too complex. In this regard, available PUF cells (hardware cells which are used for the PUF) differ greatly with regard to their stability during bit extraction. By way of example, some cells are robust and yield the same value (that is to say the same bit) with high probability during each measuring operation, while the measurement results of other cells yield rather random values (unstable bits). These unstable bits during each measuring operation would lead to a large number of bit errors within the raw data, which have to be compensated for by a subsequent error correction. This requires powerful error correction codes with correspondingly low performance during decoding, with many auxiliary data and a low useful data rate with regard to the actual data of the PUF.

In practice, during the personalization phase of the PUF the available cells are often classified, and only sufficiently robust cells are used for the extraction of the PUF data. As a result of this preselection, the number of expected errors in the raw data can be significantly reduced and the error correction can be simplified. Such a classification can be achieved by repeatedly reading the PUF cells, for example: A cell is regarded as stable only if a sufficiently large proportion of the reading operations carried out lead to the same value (result bit).

This procedure has the disadvantage, however, that the PUF cells which were identified as stable and selected during the personalization phase have to be additionally stored in the auxiliary data of the error correction method. These so-called masking data considerably increase the requirement for nonvolatile memory for the auxiliary data and enable bits of individual PUF cells to be compared during targeted, local manipulations by an attacker. As a result, new attacks are made possible: a sequence of such comparisons makes it possible, for example, to reduce the entropy of the data calculated by the PUF to a few remaining possibilities, as a result of which, for example, a key derived therefrom would be compromised. Therefore, the integrity of the masking data has to be ensured by further protective measures in order not to jeopardize the confidentiality of the PUF data.

The object of the invention is to avoid the disadvantages mentioned above and to provide in particular, a possibility for the use of a PUF with a reduced number of auxiliary data required for the error correction.

This object is achieved in accordance with the features of the independent claims. Preferred embodiments can be gathered in particular from the dependent claims.

In order to achieve the object, a method for determining an identifier on the basis of a multiplicity of cells, is proposed
  wherein the cells are subdivided into subsets,
  wherein the fact of whether a reconstructable information item is determinable is ascertained for each of the subsets,
    wherein, if a reconstructable information item is determinable for a subset, the reconstructable information item is determined and stored,
    wherein, if a reconstructable information item is not determinable for a subset, an error information item is determined and stored for this subset.

The identifier is a key, for example. The key preferably allows a unique identification of hardware, since the state of the cells differs for each hardware on account of the concrete physical realization thereof. Taking account of a sufficient number of cells makes it possible to ensure that the identifier for the respective hardware is unique with high probability.

The cells are, for example, individual bits of a memory, i.e. each cell has—depending on the respective hardware—a value "0" or "1".

A plurality of cells are subdivided into subsets. This can be a logical subdivision that is taken into account in the context of the subsequent steps of the method. The hardware itself need not have a physical correspondence to such subsets.

Firstly, the fact of whether a reconstructable information item e.g. a bit of the identifier, can be determined at all is ascertained for each of the subsets. If a reconstructable information item, e.g. a (at least one) "valid" bit, can be determined per subset, it is stored e.g. as part of a bit sequence from which the identifier can emerge.

If no reconstructable information item can be determined for a subset, in a subset there is for example no such "valid" bit which always provides the same value "0" or "1" with high probability, or the measuring device of the PUF was unable to find such a "valid" bit during the measuring operation under consideration, then an error information item is determined and this error information item is stored for the subset.

The reconstructable information item per subset and, if appropriate, the error information item per subset (for which no reconstructable information item can be determined) produces a bit sequence: this bit sequence can correspond to the identifier or the identifier can be ascertained on the basis of this bit sequence, e.g. by means of known error correction methods.

The present approach makes it possible to determine the identifier as necessary on the basis of the cells of hardware. By way of example, a PUF key can thus be read out if required.

Advantageously, the present approach does not necessitate storing masking data from a personalization phase in a nonvolatile memory. This means that no attack on the extracted PUF data by manipulation of the masking data is possible either.

In one development, the error information item is determined according to a predefined scheme.

By way of example, the error information item can be fixedly predefined (e.g. by values "0" or "1") or randomly determined for the subset.

In another development, when the PUF cells are subdivided into subsets, an error set comprising at least one cell is additionally provided, and wherein the error information item of a subset for which no "valid" bit can be determined is determined on the basis of a reconstructable information item of the error set and is stored.

The error set can have a predefined size, i.e. number of cells (or bits), and can be used e.g. for all subsets for which no reconstructable information item is ascertainable. The error set can thus provide a reconstructable information item, e.g. a bit, e.g. in order for each of said subsets.

In particular, in one development, the subdivision into subsets is applied recursively to the error set.

By way of example, the error set can be implemented recursively as a tree structure.

Moreover, in one development, the identifier comprises at least one reconstructable information item.

Furthermore, in one development, the identifier is determined by means of an error correction on the basis of the at least one reconstructable information item and/or the at least one error information item.

A next development consists in ascertaining that a reconstructable information item is determinable for a subset if at least one of the cells of the subset yields the same result for a predefined number of measuring operations or reading operations.

In one configuration, it is ascertained that a reconstructable information item is not determinable for a subset if none of the cells of the subset yields the same result for a predefined number of measuring operations or reading operations.

An alternative embodiment consists in the cells being volatile or nonvolatile memory cells of a semiconductor component (e.g. RAM, Flash, EEPROM, FeRAM).

The explanations concerning the method correspondingly apply to the other claim categories.

The above object is also achieved by means of a device for determining an identifier
comprising a multiplicity of cells,
comprising a processing unit designed in such a way that,
on the basis of subsets, wherein each subset takes account of a predefined number of cells, the fact of whether a reconstructable information item is determinable is ascertainable for each of the subsets,
wherein, if a reconstructable information item is determinable for a subset, the reconstructable information item is determinable and storable,
wherein, if a reconstructable information item is not determinable for a subset, an error information item is determinable and storable for this subset.

The processing unit mentioned here can be embodied in particular as a processor unit and/or an at least partially hardwired or logical circuit arrangement which is designed for example in such a way that the method as described herein can be carried out.

The above explanations concerning the method correspondingly apply to the device. The device can be implemented in one component or in a distributed fashion in a plurality of components.

In a next configuration, the processing unit is designed in such a way that the identifier is determinable by means of an error correction on the basis of the at least one reconstructable information item and/or the at least one error information item.

Moreover, in one configuration, the device is a semiconductor component.

One development consists in the device being integrated on an individual chip.

The solution presented here furthermore comprises a computer program product loadable directly into a memory of a digital computer, comprising program code parts suitable for carrying out steps of the method as described here.

Furthermore, the abovementioned problem is solved by means of a computer-readable storage medium, e.g. of an arbitrary storage means, comprising computer-executable instructions (e.g. in the form of program code, suitable for the computer to carry out steps of the method described here.

Moreever, the object mentioned above is achieved by means of a system comprising at least one of the devices described here.

The above-described properties, features and advantages of this invention and the way in which they are achieved are explained in greater detail in connection with the following schematic description of exemplary embodiments in association with the drawings. In this case, identical or identically acting elements may be provided with identical reference signs, for the sake of clarity.

In the figures:

FIG. 3 shows a schematic flow diagram showing steps for creating an identifier (a key).

Figure 1:
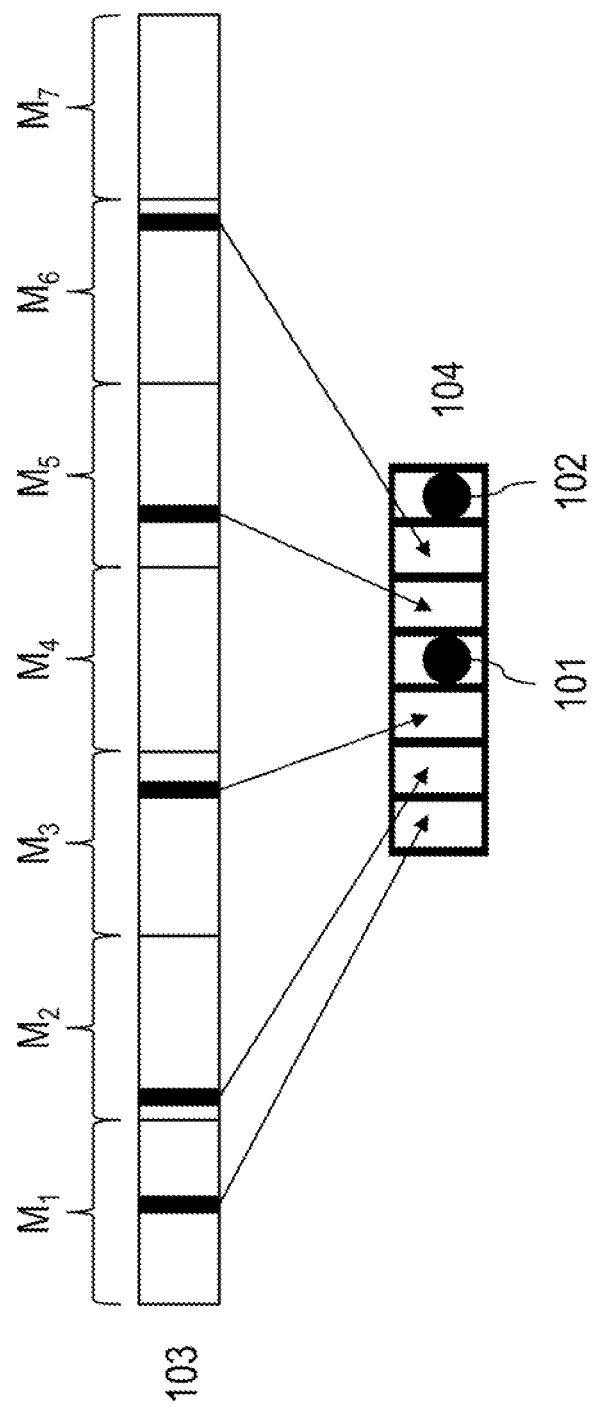
FIG. 1 shows a schematic diagram comprising a multiplicity of cells of a chip which are subdivided into subsets, wherein a reconstructable information item or an error information item is determined for each of the subsets.

It is proposed, in particular, that cells identified as stable and used for the reconstruction of the PUF data (also designated as identifier) are determined anew each time a PUF is read out.

Storing masking data from the personalization phase in the nonvolatile memory is obviated in this case. Attacks on the data by manipulation of the masking data are not possible either.

By way of example, a chip having a memory area which can be used for a PUF is provided. The memory area comprises cells, e.g. individual bits, which output either a value "0" or a value "1" during a read access. On account of the physical properties of the memory area, the values of the individual bits are characteristic of the chip, i.e. during the reading of the memory the structure of the chip produces a unique bit sequence that is characteristic of said chip (also designated as "key"). What is problematic in this case, however, is that individual bits per reading operation can yield non-deterministically different values, but the key should be reconstructable with a high degree of certainty.

The approach described here proposes, for example, for the reconstruction of n bits, partitioning the available PUF cells into sets $M_1, \ldots, M_n$ and a set $M_e$ for the error case. A power of the sets $M_i$ should be chosen here such that the expected number of stable PUF cells per subset is sufficiently high (for example $\approx 1$ or greater).

During the reconstruction of the PUF, the cells of the sets $M_i$ for $1 \leq i \leq n$ are then tested for stable PUF cells in a fixedly predefined order (for example by repeated reading of the PUF cells with acceptance of the cell if a sufficiently large proportion of the reading operations carried out lead to the same result bit). The bit value of the first stable cell found in this way is taken as the result $b_i \in \{0, 1\}$ of the i-th bit of the PUF calculation.

If no stable cell is found in the set $M_i$, then a next stable cell is sought among the as yet untested cells of the set $M_e$ in a predefined order. In this case, the bit value of the next stable cell of the set $M_e$ is taken as the result of the i-th bit of the PUF calculation. If the set $M_e$ contains no stable PUF bits among the remaining cells, the value of the i-th bit of the PUF calculation can be tied to a fixed predetermined value, for example, or the reconstruction of the PUF fails and the method terminates. Otherwise, the sequence of the bits $b_1, \ldots, b_n$ forms the result of the PUF calculation.

What is achieved by the assignment of the subsets $M_i$ of the partition to the positions i of the reconstructed bits $b_i$ is that individual errors which occur as a result of changing identification of the stability of PUF cells during the reconstruction cannot cause a large number of errors at positions of subsequent bits. The errors either remain restricted directly to the set $M_i$ and thus only to the bit $b_i$ or first have an effect again in the sequence of the bits reconstructed from the set $M_e$ for the error case. The number of bits reconstructed from the set $M_e$ for the error case will generally be much less than the number of remaining bits still to be reconstructed. In addition in this way, the positions of the subsequently reconstructed bits can no longer be shifted because the insertion or erasure of bits does not occur.

The partition method described can be applied recursively to the sequence of the bits reconstructed from the set $M_e$ for the error case, in order to further reduce the expected number of bit errors during the reconstruction. By way of example, the following steps can be used for this purpose:

subsivide the sequence of bits $b_1, \ldots, b_n$ into k subsequences where k>2 and partition the set $M_e$ for the error case into subsets for errors in the j-th part of the subsequence where 1<j<k.

This partitioning approach can be continued in a treelike manner for higher-order errors. Consequential errors can then have an effect only along the tree paths.

Furthermore, variants are possible with regard to the selection of the bits within the sets $M_i$. By way of example, the cell with the fewest changes during all measuring operations of the set $M_i$ can be chosen as the bit $b_i$.

The number of PUF cells required increases linearly in n. The exact proportionality factor depends firstly on a probability that a PUF cell can be read out stably, and secondly is determined by a limit for the probability that the reconstruction of the PUF is permitted to fail.

The partitioning and selection method described can be realized compactly in hardware and/or software, for example.

In principle, a partitioning into subsets can be carried out and (if appropriate initially) the error set $M_e$ can be dispensed with. If the search for a stable PUF cell in a partitioned set fails, a result bit is assigned to this set arbitrarily or according to a predefined scheme (for example always 0 or 1 or randomly etc.). In this case the bit reconstructed for this subset is incorrect with a certain probability and is corrected by the error correction for the extracted bits.

The error set described above can optionally be used. If the fact that at least one of the subsets does not yield a stable cell is identified e.g. as early as upon the (first) determination of the PUF, a reconstructable bit can be assigned to this subset with the aid of the error set. Accordingly, the error set makes it possible to reduce the number of errors in the reconstructed bits.

FIG. 1 shows a schematic diagram comprising a multiplicity of cells 103 of a chip which are subdivided into subsets $M_1$ to $M_7$. In the example according to FIG. 1, a stable cell can in each case be identified for the subsets $M_1$ to $M_3$, $M_5$ and $M_6$ and can be stored as part of a bit sequence 104. No stable cell can be identified for the subsets $M_4$ and $M_7$, and a predefined or random bit is stored as part of the bit sequence 104 at the corresponding locations 101, 102. A subsequent error correction makes it possible to reconstruct the identifier on the basis of the bit sequence 104.

Figure 2:
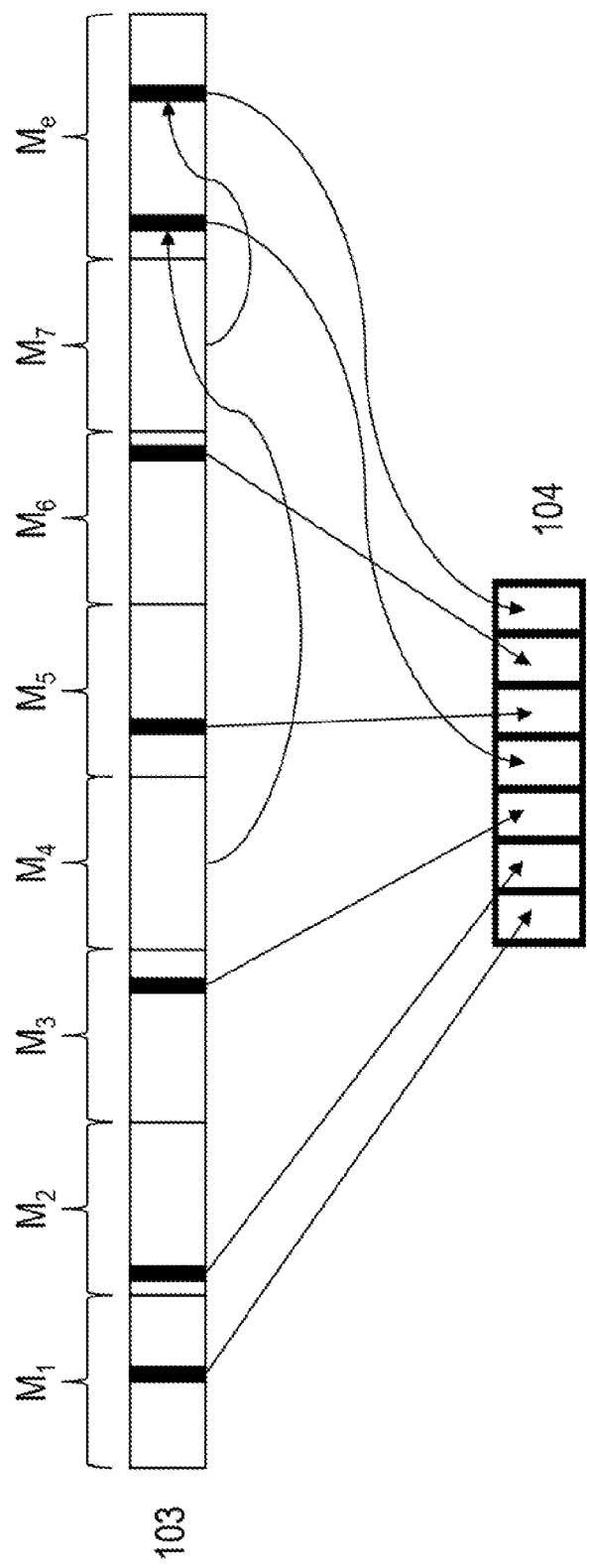
FIG. 2 shows a schematic diagram on the basis of the illustration in accordance with FIG. 1, wherein the error information item is determined on the basis of an error set.

FIG. 2 shows a schematic diagram on the basis of the illustration in accordance with FIG. 1. In contrast to FIG. 1, FIG. 2 comprises a set for the error case (also designated as error set) $M_e$.

In the example in accordance with FIG. 2 as well, no stable cell can be identified in each of the subsets $M_4$ and $M_7$. Since no stable cell was found in the subset $M_4$, a stable cell is sought in the set $M_e$ and this is stored in the bit sequence 104. Since no stable cell was found in the subset $M_7$, the set $M_e$ is further searched for a stable cell and this is stored in the bit sequence 104. In this case, the bit sequence 104 corresponds to the identifier; an error correction is no longer required, if appropriate.

It should be noted here that the subsets $M_i$, can be of the same size or of at least partly different sizes. The error set $M_e$ can be of the same size as one of the subsets $M_i$ or of a different size relative thereto.

Furthermore, it should be noted that the subdivision into subsets can be carried out arbitrarily. Moreover, the order of the cells or bits considered in the subsets can follow different predefined patterns; by way of example, the cells within a set can be processed in order, alternately or according to other addressing schemes.

FIG. 3 shows a schematic flow diagram showing steps for creating an identifier (a key): a step 301 involves carrying out a measurement of one cell or of a multiplicity of cells; the result of the measurement is provided as digital data in a step 302. By way of example, steps 301 and 302 can also be a reading operation on memory cells of a chip. A step 303 involves selecting stable bits (cells) in accordance with the approach presented here. By means of an error correction (step 304) the identifier (step 305) is determined therefrom. The identifier can be used as unique identification of hardware.

Further Examples and Advantages

One example of the present approach is described below. From in each case 24 PUF cells, a sequence of positions with 16 stable cells is intended to be determined. An algorithm for selecting the PUF cells during the reconstruction reads as follows in a notation similar to the programming language C:

```
j = 16;
for (i = 1; i < 17; i++) {
  if (bit i is weak) {
    do {
      j++;
      if (j > 24) exit(failure);
    } while (bit j is weak);
    printf("bit %d at pos %d", j, i);
  } else printf("bit %d at pos %d", i, i);
}
```

The expression "is weak" indicates that an individual bit (is "weak" and) cannot be reconstructed stably, that is to say that a predefined number of reading operations do not enable a unique reconstruction of the value of this bit. By way of example, it is possible to carry out a majority decision on the basis of a plurality of reading operations if more than a predefined portion of the reading operations yield a result "0" or "1". Moreover, it is possible for a bit to be classified as "weak" as soon as at least two reading operations do not yield the same result.

The expression "exit(failure)" identifies a termination condition in the error case if the PUF bits of the set $M_e$ that are provided for the treatment of errors of the subdivided sets have been used up.

In this case, the sets $M_i$, each consist of the element $b_i$, while $1 \leq i \leq 16$. The set $M_e$ contains the elements $b_{17}, \ldots, b_{24}$.

A further example uses a recursive tree structure with one-element error sets having the cells $b_0, \ldots, b_{15}$ for in each case two further cells. In this case, the error set having the cell $b_1$ serves for treating possible errors of the cells having the numbers 2*i and 2*i+1:

```
for (i = 0; i < 16; i++) used[i] = FALSE;
for (i = 16; i < 32; i++) {
  if (bit i is weak) {
    j = i;
    do {
      if (j == 0) exit(failure);
      j /= 2;
      if (bit j is weak) used [j] = TRUE;
    } while (used[j]);
    used[j] = TRUE;
    printf("bit %d at pos %d", i-16, j);
  } else printf("bit %d at pos %d", i-16, i);
}
```

In the array used[ . . . ] it is noted here which part of the tree composed of error sets has already been used for treating errors as a result of weak PUF cells.

Although the invention has been described and illustrated more specifically in detail by means of the at least one exemplary embodiment shown, nevertheless the invention is not restricted thereto and other variations can be derived therefrom by a person skilled in the art, without departing from the scope of protection of the invention.

The invention claimed is:

1. A method for determining an identifier of a memory based on a plurality of cells of the memory, the method comprising:
   subdividing the cells into subsets; and
   ascertaining whether a reconstructable information item is determinable for each of the subsets,
   wherein, if a reconstructable information item is determinable for a subset, determining and storing the reconstructable information item as a bit of a bit sequence of the identifier, and
   wherein, if a reconstructable information item is not determinable for a subset, determining and storing for this subset an error information item as one or more bits of the bit sequence of the identifier.

2. The method as claimed in claim 1, wherein the error information item is determined according to a predefined scheme.

3. The method as claimed in claim 1, wherein the error information item is fixedly predefined or randomly determined for the subset.

4. The method as claimed in claim 1, further comprising:
   providing an error set comprising at least one cell,
   wherein the error information item is determined based on a reconstructable information item of the error set and is stored.

5. The method as claimed in claim 4, further comprising:
   recursively applying the subdividivision of the error error set into subsets.

6. The method as claimed in claim 1, wherein the identifier comprises at least one reconstructable information item.

7. The method as claimed in claim 1, wherein the identifier is determined by means of an error correction based on at least one of the at least one reconstructable information item and the at least one error information item.

8. The method as claimed in claim 1, further comprising:
   ascertaining that a reconstructable information item is determinable for a subset if at least one of the cells of the subset yields the same result for a predefined number of measuring operations or reading operations.

9. The method as claimed in claim 1, further comprising:
ascertaining that a reconstructable information item is not determinable for a subset if none of the cells of the subset yields the same result for a predefined number of measuring operations or reading operations.

10. The method as claimed in claim 1, wherein the cells are volatile or novolatile memory cells of a semiconductor component.

11. A non-transcient computer-readable medium comprising program instructions for causing a computer to perform a method for determining an identifier of a memory based on a plurality of cells of the memory, the method comprising:
subdividing the cells into subsets; and
ascertaining whether a reconstructable information item is determinable for each of the subsets,
wherein, if a reconstructable information item is determinable for a subset, determining and storing the reconstructable information item as a bit of a bit sequence of the identifier, and
wherein, if a reconstructable information item is not determinable for a subset, determining and storing for this subset an error information item as one or more bits of the bit sequence of the identifier.

12. A device for determining an identifier of a memory, comprising:
a plurality of cells; and
a logical circuit configured to take in account for each subset a predefined number of cells, and ascertain whether a reconstructable information item is determinable for each of the subsets,
wherein, if a reconstructable information item is determinable for a subset, the reconstructable information item is determinable and storable as a bit of a bit sequence of the identifier, and
wherein, if a reconstructable information item is not determinable for a subset, an error information item is determinable and storable for this subset as one or more bits of the bit sequence of the identifier.

13. The device as claimed in claim 12, wherein the logical circuit is further configured to determine by means of an error correction the identifier based on at least one of the at least one reconstructable information item and the at least one error information item.

14. The device as claimed in claim 12, wherein the device is a semiconductor component.

15. The device as claimed in claim 12, wherein the device is integrated on an individual chip.

16. A system comprising at least one device as claimed in claim 12.

* * * * *